US009555935B2

(12) United States Patent
Fiedler

(10) Patent No.: US 9,555,935 B2
(45) Date of Patent: Jan. 31, 2017

(54) CLOSURE DEVICE

(75) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 73 days.

(21) Appl. No.: 14/359,752

(22) PCT Filed: Jul. 9, 2012

(86) PCT No.: PCT/EP2012/063396
§ 371 (c)(1),
(2), (4) Date: May 21, 2014

(87) PCT Pub. No.: WO2013/075851
PCT Pub. Date: May 30, 2013

(65) Prior Publication Data

US 2014/0339232 A1 Nov. 20, 2014

(30) Foreign Application Priority Data

Nov. 23, 2011 (DE) ........................ 10 2011 086 960

(51) Int. Cl.
*F16B 21/00* (2006.01)
*B65D 43/20* (2006.01)
(Continued)

(52) U.S. Cl.
CPC ............. *B65D 43/20* (2013.01); *A44B 11/258* (2013.01); *A44B 11/266* (2013.01); (Continued)

(58) Field of Classification Search
CPC .............. E05B 2063/0026; E05B 83/38; E05B 47/0038; A45C 13/1069; A45C 13/1092; A45C 13/123; H01F 7/0263; A44B 11/266; A44B 11/258; B65D 43/20; Y10T 24/32
See application file for complete search history.

(56) References Cited

U.S. PATENT DOCUMENTS 1,265,869 A * 5/1918 Arkin .................. A44B 11/266 24/657
1,271,650 A * 7/1918 Arkin .................. A44B 11/266 24/657
(Continued)

FOREIGN PATENT DOCUMENTS

DE 202010010300 U1 11/2010
DE 102010044144 B3 5/2012
(Continued)

*Primary Examiner* — Daniel P Stodola
*Assistant Examiner* — Matthew R McMahon
(74) *Attorney, Agent, or Firm* — The Webb Law Firm

(57) ABSTRACT

A closure device for connecting two parts is provided. The closure device includes a connector, a housing which includes a connector receptacle, into which the connector can be inserted in a closing direction for closing the closure device, a slide shiftably arranged at the housing, which for opening the closure device is shiftable along an opening direction different from the closing direction, a detent spring element which in a closed position of the closure device latchingly holds the connector at the housing and for opening the closure device can be moved out of engagement with the connector by shifting the slide in the opening direction, in order to release the connector from the housing, so that in an open position of the closure device the connector is separated from the housing, and at least one guide element which guides the connector on insertion into the connector receptacle for closing the closure device along the closing direction into the closed position and supports the connector against tilting relative to the closing direction when the slide is shifted for opening the closure device.

14 Claims, 14 Drawing Sheets

(51) Int. Cl.

| | |
|---|---|
| ***A44B 11/25*** | (2006.01) |
| ***A44B 11/26*** | (2006.01) |
| ***A45C 13/10*** | (2006.01) |
| ***A45C 13/12*** | (2006.01) |
| ***E05B 47/00*** | (2006.01) |
| ***H01F 7/02*** | (2006.01) |
| ***E05B 65/52*** | (2006.01) |
| ***E05B 83/38*** | (2014.01) |
| *E05B 63/00* | (2006.01) |

(52) U.S. Cl.

CPC ...... *A45C 13/1069* (2013.01); *A45C 13/1092* (2013.01); *A45C 13/123* (2013.01); *E05B 47/0038* (2013.01); *E05B 65/52* (2013.01); *E05B 83/38* (2013.01); *H01F 7/0263* (2013.01); *A44D 2203/00* (2013.01); *E05B 2063/0026* (2013.01)

(56) References Cited

U.S. PATENT DOCUMENTS

| | | | | | |
|---|---|---|---|---|---|
| 5,664,298 | A * | 9/1997 | Nessar-Ivanovic .. | A44C 5/2071 24/303 |
| 5,868,445 | A * | 2/1999 | Kaufman ........... | A45C 13/1069 292/251.5 |
| 5,937,487 | A * | 8/1999 | Bauer ..................... | A41F 1/002 24/303 |
| 6,092,846 | A * | 7/2000 | Fuss .................... | E05B 47/0002 292/144 |
| 6,131,247 | A * | 10/2000 | Morita ............... | A45C 13/1069 24/303 |
| 6,182,336 | B1 * | 2/2001 | Bauer ..................... | A41F 1/002 24/303 |
| 6,295,702 | B1 * | 10/2001 | Bauer ................ | A45C 13/1069 24/303 |
| 6,564,434 | B1 * | 5/2003 | Morita ............... | A45C 13/1069 24/114.2 |
| 7,607,205 | B2 * | 10/2009 | Grunberger ........ | A45C 13/1069 24/303 |
| 8,353,544 | B2 | 1/2013 | Fiedler | |
| 8,430,434 | B2 | 4/2013 | Fiedler | |
| 8,495,803 | B2 * | 7/2013 | Fiedler ............... | A45C 13/1069 220/230 |
| 8,739,371 | B2 | 6/2014 | Fiedler | |
| 8,851,534 | B2 * | 10/2014 | Fiedler ............... | A45C 13/1069 220/230 |
| 2009/0071502 | A1 * | 3/2009 | Drugeon ............ | A45C 13/1069 132/293 |
| 2010/0287741 | A1 | 11/2010 | Fiedler | |
| 2011/0265289 | A1 * | 11/2011 | Wu .................... | A45C 13/1069 24/303 |
| 2011/0298227 | A1 | 12/2011 | Fiedler | |
| 2012/0248793 | A1 | 10/2012 | Fiedler | |

FOREIGN PATENT DOCUMENTS

| | | | |
|---|---|---|---|
| GB | 2419917 | A | 5/2006 |
| JP | 2001275717 | A | 10/2001 |
| WO | 2008006357 | A2 | 1/2008 |
| WO | 2009092368 | A2 | 7/2009 |

* cited by examiner

CLOSURE DEVICE

CROSS-REFERENCE TO RELATED APPLICATIONS

This application is the United States national phase of International Application No. PCT/EP2012/063396 filed Jul. 9, 2012, and claims priority to German Patent Application No. 10 2011 086 960.3 filed Nov. 23, 2011, the disclosures of which are hereby incorporated in their entirety by reference.

BACKGROUND OF THE INVENTION

Field of the Invention

This invention relates to a closure device for connecting two parts.

Description of Related Art

Such closure device includes a connector and a housing with a connector receptacle, into which the connector can be inserted in a closing direction for closing the closure device. On the housing, a slide is arranged in a shiftable way, which for opening the closure device can be shifted along an opening direction different from the closing direction.

Such closure devices for example serve for connecting two belts, as closure for a bag, a backpack, a suitcase or a box, as closing mechanism for other lids, for example a glove box, or as closure for connecting any other parts. One part here is to be connected with the connector and another part with the housing, so that by arranging the connector in the connector receptacle of the housing a connection of the parts can be established.

In a closed position of the closure device the connector is mechanically held at the housing. For opening the closure device, the slide can be shifted along the opening direction and the connector thereby can be released from the housing, so that in an open position of the closure device the connector is separated from the housing.

By the fact that the opening direction is different from the closing direction it is to be understood here that the opening direction does not point along the closing direction, i.e. is not directed inversely to the closing direction. The opening direction thus includes an angle to the closing direction which differs from 0° and 180°.

The closure device includes a detent spring element which in a closed position of the closure device latchingly holds the connector at the housing and for opening the closure device can be moved out of engagement with the connector by shifting the slide in the opening direction, in order to release the connector from the housing, so that in an open position of the closure device the connector is separated from the housing. For opening the closure device, the slide thus is moved in the opening direction and the detent spring element, which in the closed position mechanically holds the connector at the housing, is moved thereby.

In principle, a movement of the slide relative to the housing and to the connector thus is effected for opening, which effects that the mechanical hold of the connector at the housing is eliminated. During the opening movement of the slide an action of force on the connector, for example due to friction, also can occur, which connector thus is loaded relative to the housing and possibly may cant in the connector receptacle of the housing. Separating the connector from the housing therefore can become difficult or even impossible, and the operability of the closure device thus can be impaired.

In a closure device known from WO 2008/006357 A2 a latching mechanism is provided for mechanically holding a connector at a housing, which is formed by a spring locking element at the one of connector and housing and a blocking piece at the other one of connector and housing. For opening the closure device the connector for example can be rotated relative to the housing, so as to bring the latching mechanism out of its latching engagement, so that the connector can be removed from the housing. In addition, a magnet-armature construction is provided, which effects a force of magnetic attraction between the connector and the housing for supporting the closing operation of the closure device.

SUMMARY OF THE INVENTION

It is an object of the present invention to provide a closure device which can be closed and be opened again in a simple, haptically pleasant way.

According to an exemplary embodiment of the invention, at least one guide element is provided, which on insertion into the connector receptacle for closing the closure device guides the connector along the closing direction into the closed position and supports the connector against tilting relative to the closing direction when the slide is shifted for opening the closure device.

The present invention proceeds from the idea to provide a guide element at the connector or the housing, which has a supporting effect between the connector and the housing and in particular prevents tilting of the connector in the connector receptacle of the housing on opening of the closure device. The guide element on the one hand facilitates the insertion of the connector into the connector receptacle. On the other hand, the guide element supports the connector in the connector receptacle such that the position of the connector relative to the housing is defined and in particular tilting of the connector relative to the housing cannot easily be effected, so that it is ensured that after actuation of the slide for opening the closure device, the connector can be removed from the connector receptacle in a simple, haptically pleasant way and the connector and the housing thus can be separated.

In principle, one or more guide elements can be arranged at arbitrary points on the connector and/or the housing, as long as they ensure that the position of the connector relative to the housing is defined in the closed position and thus merely an axial movement of the connector relative to the housing is possible along the closing direction.

In an advantageous embodiment, at least one guide element is arranged at the connector receptacle, wherein the connector receptacle advantageously is formed by a for example cylindrical recess at the housing. The at least one guide element in this case can be formed by a surface portion at the connector receptacle of the housing, which extends along the closing direction and in the closed position is in full contact with the connector. Due to the fact that the guide element extends axially along the closing direction, an axial guidance of the connector becomes possible by simultaneously fixing the position in the closed position, so that the connector cannot tilt in the connector receptacle.

In a further advantageous embodiment, the at least one guide element can be arranged at the housing such that in the case of a load acting on the connector in the closing direction relative to the housing the guide element supports the connector. The guide element thus is arranged on a side of the connector receptacle to which the connector is approached when loaded in the opening direction, so that when the connector is loaded in the opening direction, the guide element gets in contact with the connector and supports the connector, so that the connector cannot tilt in the connector receptacle.

The connector for example can include a pin with which the connector can be inserted into the connector receptacle. At the pin a first latching portion advantageously is arranged, which in the closed position latchingly gets in engagement with a second latching portion at the housing or the slide, so that in the closed position the connector is latchingly held at the housing via the pin.

In the closed position the pin advantageously rests against the at least one guide element, so that the position of the pin at the housing is specified in the closed position by one or more guide elements. The one or more guide elements thus on the one hand serve for guiding the pin into the closed position when attaching the connector to the housing, and on the other hand for fixing and supporting the position of the connector at the housing in the closed position.

The first latching portion preferably is arranged at the pin circumferentially around the closing direction, so that the connector can be attached to the housing in different rotatory positions.

In a first exemplary embodiment, the detent spring element can resiliently be arranged at the slide. The second latching portion for example can be arranged at a detent spring element which is attached to the slide. The detent spring element here is spring-elastic in a direction transverse to the closing direction such that on closing of the closure device it can be spread in the direction transverse to the closing direction, so that the detent spring element can latchingly get in engagement with the latching portion of the pin. For closing the closure device, the connector is inserted into the connector receptacle with its pin, so that the first latching portion of the pin runs up onto the second latching portion of the detent spring element and thereby elastically pushes the detent spring element aside, until the pin latchingly gets in engagement with the detent spring element.

The detent spring element for example can integrally be formed at the slide. It is, however, also conceivable to arrange the detent spring element at the slide as an additional component, wherein the connection of the detent spring element with the slide is such that for establishing the connection between the connector and the detent spring element, the detent spring element can elastically be pushed aside transversely to the closing direction.

The detent spring element serves to establish a positive connection of the connector with the slide and thereby with the housing, in order to mechanically hold the connector at the housing in the closed position. The detent spring element is designed such that by shifting the slide in the opening direction the positive engagement between the detent spring element and the pin of the connector is eliminated, for example in that the first latching portion of the pin of the connector and the second latching portion of the detent spring element at the slide are shifted out of engagement by moving the slide in the opening direction.

In an advantageous design, the detent spring element can be formed by a circumferentially open ring, which in the closed position encloses the pin of the connector at least in sections circumferentially around the closing direction. By moving the slide in the opening direction, the detent spring element then is moved out of engagement with the pin of the connector, wherein for this purpose the detent spring element is moved to the pin such that the pin is moved through the circumferential opening of the detent spring element and brought out of engagement with the detent spring element.

The connector, in particular the pin of the connector, for example is formed substantially rotationally symmetrical around the closing direction. In particular, the pin can be cylindrical in its basic shape, wherein at an end of the pin pointing towards the housing (based on a proper attachment of the connector to the connector receptacle of the housing) the (first) latching portion is formed and extends around the pin. This effects that the connector can be attached to the connector receptacle of the housing in an arbitrary rotatory alignment around the closing direction and in the closed position can rotationally movably be held at the housing.

For opening the closure device, the slide is moved in the opening direction relative to the housing. It can be provided that the slide is biased against the opening direction relative to the housing, for example mechanically (resiliently), pneumatically, due to the acting gravity or magnetically in direction of a position in which the connector can mechancially be connected with the housing for closing the closure device. In this way, it can be effected that after actuation of the slide for opening the closure device, the slide is automatically set back into a position in which the connector can again be brought in engagement with the housing or a detent spring element at the slide.

The detent spring element also can be realized by the slide itself. For this purpose, the second latching portion can rigidly be arranged at the slide, wherein the slide itself is elastically biased with respect to the housing and thereby formed resilient. For closing, the first latching portion of the connector runs up onto the second latching portion of the slide and in this way pushes the latching portion aside—by (slightly) moving the slide against its bias—, until the first latching portion snaps into engagement with the second latching portion.

In an additional exemplary embodiment, magnetic means can be arranged at the connector on the one hand and/or at the slide on the other hand, which magnetically support the closing of the closure device. The magnetic means are designed to effect a force of magnetic attraction between the connector and the housing and/or the slide, such that the connector in a magnetically supported way, advantageously substantially automatically, is pulled into engagement with the connector receptacle when approaching the connector receptacle, so that the closing operation can be effected largely automatically and hence in a way haptically pleasant for a user.

In a concrete embodiment, at least one magnet each can be arranged for example at the connector and at the slide. The magnets at the connector and the slide can be designed such that on closing of the closure device they have a magnetically attracting effect between the connector and the slide and thereby magnetically support the closing of the closure device.

In addition, it can be provided that when shifting the slide in the opening direction for opening the closure device, the poles of the magnets of the connector and the slide, which oppose each other in a magnetically attracting way, are moved away from each other and like poles of magnets at the connector and at the slide are approached towards each other, so that a force of magnetic repulsion is caused between the connector and the slide, which acts against the closing direction and magnetically supports an ejection of the connector from the connector receptacle at the housing.

The magnet arrangement at the connector and at the slide can be designed such that the force of magnetic repulsion just is at a maximum when the engagement between the connector and the housing (i.e. for example between the pin with its latching portion at the connector and the detent spring element at the slide) is released and the connector thus can be removed.

A magnetic repulsion on opening of the closure device can be reached in that magnetically like poles are approached towards each other when shifting the slide in the opening direction. A magnetic repulsion however also is obtained e.g. when magnets which in the closed position oppose each other with unlike poles in a magnetically attracting way, on opening are moved towards each other tangentially with their opposed pole surfaces. When the magnets have an at least approximately identical pole shape (i.e. when the surfaces with which the poles oppose each other are shaped substantially identical) and when the magnets are shifted relative to each other along the opening direction by a certain distance, e.g. approximately by their width (measured in the opening direction) or by slightly less than their width, and when the pole surfaces are kept parallel to each other (so that the magnets e.g. approximately lie edge on edge), a magnetic repulsion is obtained between the magnets, which during further shifting reaches a maximum and then slowly decreases. Dimensioning the shifting path such that the repulsion is close to a maximum, can be advantageous for an easy, haptically pleasant ejection of the connector on opening. This ejection effect caused by the magnetic repulsion occurs even more strongly the more accurately the connector is held in its position and is guided by guide elements and thus prevented from tilting.

BRIEF DESCRIPTION OF THE DRAWINGS

The idea underlying the invention will be explained in detail below with reference to the exemplary embodiments illustrated in the Figures, in which:

FIGS. 1, 2 and 3A to 3D show a closure device 1 which includes a connector 2, a housing 3 and a slide 4 shiftably arranged at the housing 3.

Figure 1:
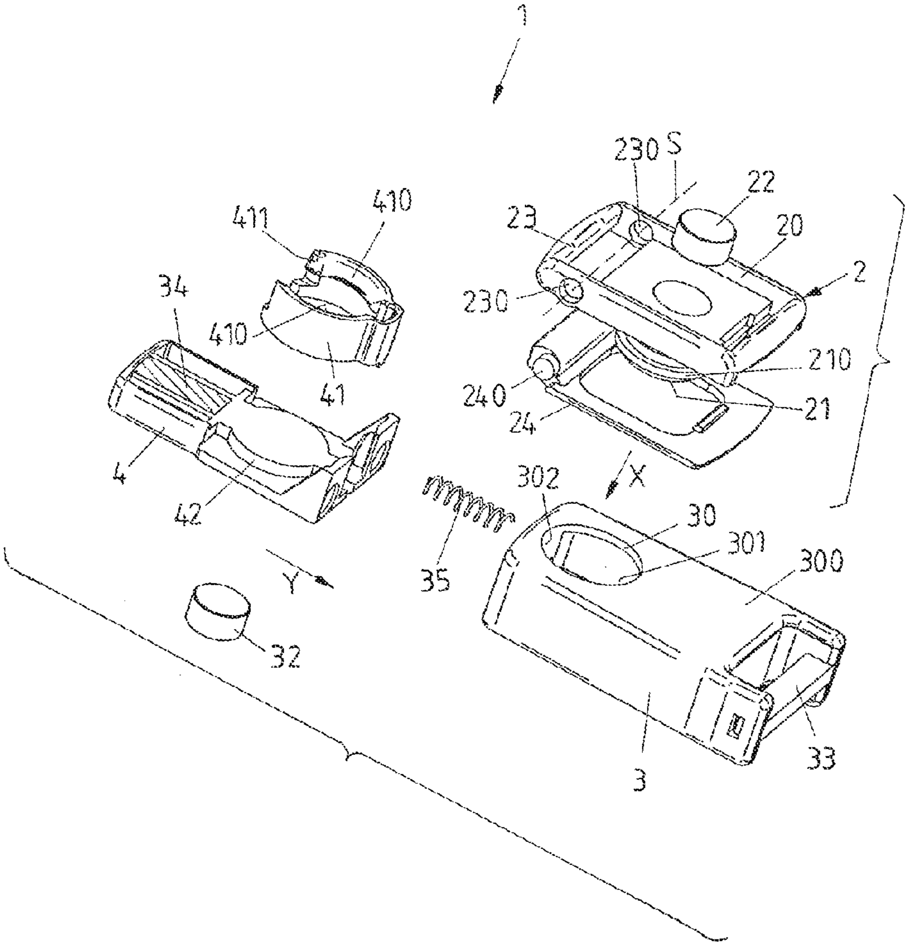
FIG. 1 shows a perspective exploded view of an exemplary embodiment of a closure device with a connector, a housing and a slide arranged thereon.

The closure device 1 serves for connecting two parts, for example as closure for a bag, a backpack or another flap, as connecting device for connecting two belts or cables or for connecting two other parts. One part here is attached to the connector 2, while the other part is connected with the housing 3. In a closed position, shown in FIG. 3B, the connector 2 is held at the housing 3, so that the two parts are connected with each other via the connector 2 and the housing 3. In an open position, shown in FIGS. 3A and 3D, the connector 2 and the housing 3 are separated, so that there is no connection between the parts.

In the closure device 1 the connector 2 includes a body 20 with a fastening device 23 for connecting a part (the fastening device 23 for example can be designed as thread onto which a fastening part can be screwed for clampingly connecting a component, for example a lid, a flap or the like) and a pin 21 with a latching portion 210. With the pin 21, the connector 2 can be inserted into a connector receptacle 30 at the housing 3, so that in the closed position the connector 2 engages into the connector receptacle 30 with the pin 21 and with the latching portion 210 of the pin 21 positively is in engagement with latching portions 410 of a spring locking element 41 at the slide 4.

Figure 2:
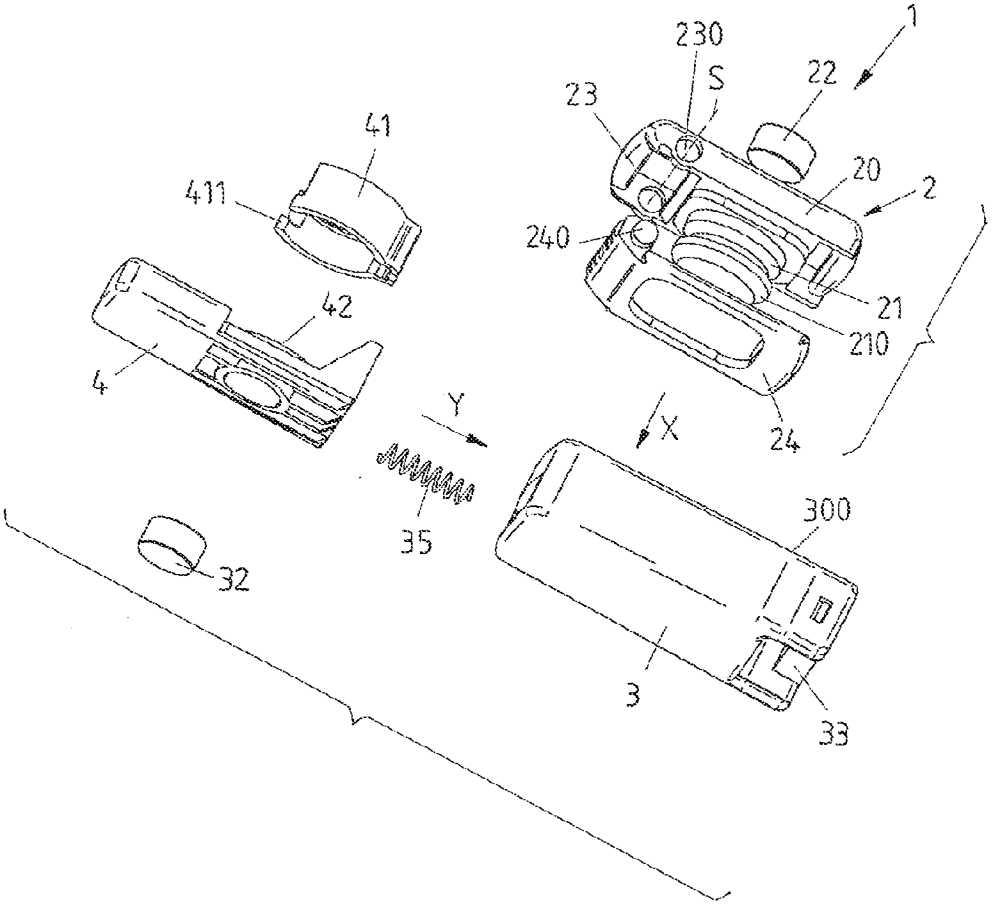
FIG. 2 shows another perspective exploded view of the closure device according to FIG. 1.

The pin 21 of the connector 2 has a shape rotationally symmetrical around a closing direction X with a circumferential latching portion 210 (see FIGS. 1 and 2). With the pin 21 the connector 2 can be inserted into the circular connector receptacle 30 and the housing 3, in that the pin 21 is attached to the connector receptacle 30 in the closing direction X and is brought in engagement with the latching portions 410 of the spring locking element 41 at the slide 4.

The spring locking element 41 is arranged at a raised, protruding holding element 42 of the slide 4 such that the spring locking element 41 is fixed at the slide 4 along an opening direction Y, along which the slide is shiftably mounted at the housing 3, but can be spread in an elastically resilient manner transversely to the closing direction X and opening direction Y. For this purpose, the spring locking element 4 is formed substantially ring-shaped and circumferentially includes an opening 411 (see FIGS. 1 and 2), so that the spring locking element 41 can be spread apart transversely to the closing direction X and opening direction Y, such that the connector 21 with the latching portion 210 can run up onto the latching portions 410 of the spring locking element 41 and thereby push the latching portions 410 radially to the outside, and thus the pin 21 latchingly snaps into engagement with the spring locking element 41 when the connector 2 is attached to the connector receptacle 30 in the closing direction X.

The substantially ring-shaped spring locking element 41 is formed as separate component and arranged at the slide 4. It is, however, also conceivable to design the spring locking element 41 integrally with the slide 4.

The slide 4 is shiftably arranged at the housing 3 along an opening direction Y and for this purpose guided on a sliding guideway 31 of the housing 3.

Figure 3A:
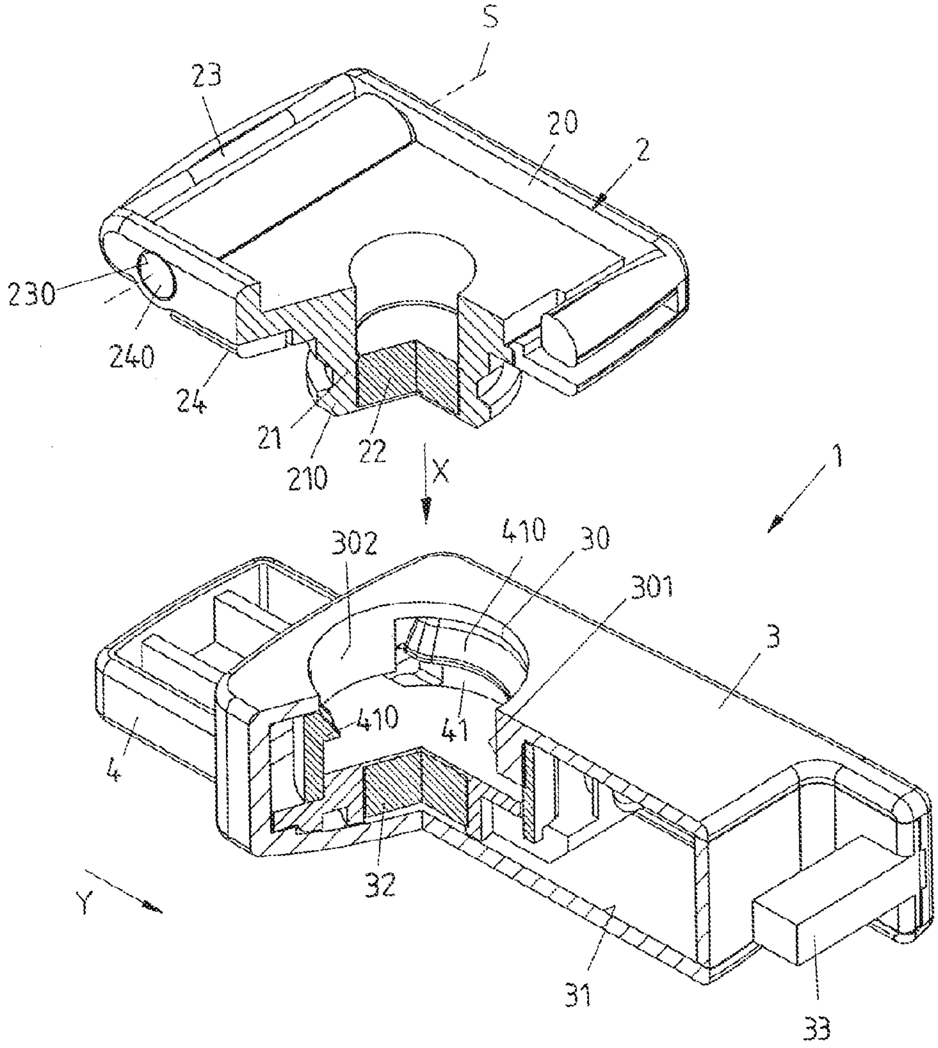
FIG. 3A shows a view of the closure device before closing.
Figure 3B:
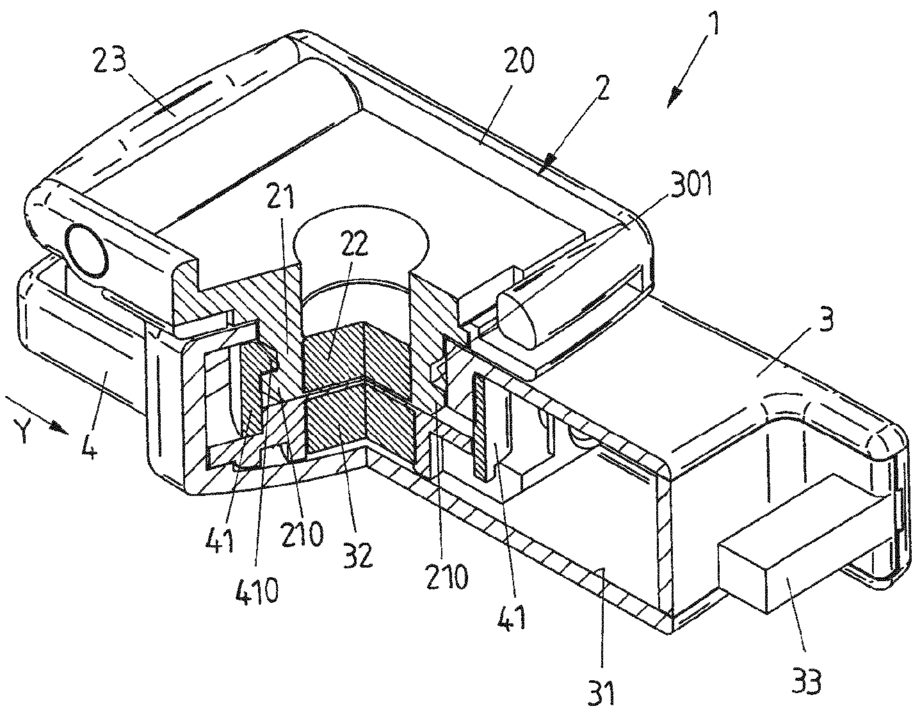
FIG. 3B shows a view of the closure device in a closed position.

For closing (see FIG. 3A) or in the closed position (see FIG. 3B) of the closure device 1, the slide 4 takes the position shown in FIGS. 3A and 3B, in which the detent spring element 41 is arranged concentrically to the connector receptacle 30 such that the connector 2 with the pin 21 can be brought or be in engagement with the latching portions 410 of the detent spring element 41. In the closed position, the pin 21 positively is in engagement with the latching portions 410 of the detent spring element 41 via the circumferential latching portion 210, so that the connector 2 cannot be removed from the housing 3 against the closing direction X.

In this connection it should be noted that the slide 4 is guided at the housing 3 along the opening direction Y, but is fixed relative to the housing 3 along the closing direction X, so that by the engagement of the pin 21 with the detent spring element 41 the connector 2 is held at the housing 3 via the slide 4 against the closing direction X.

For opening (see FIG. 3C), the slide 4 can be shifted in an opening direction Y relative to the housing 3. Because the detent spring element 41 is held at the slide 4, the detent spring element 41 is moved in the opening direction Y together with the slide 4, so that the pin 21 passes through the circumferential opening 411 (see FIGS. 1 and 2) of the detent spring element 41 and thereby gets out of engagement with the latching portions 410 of the detent spring element 41.

In an open position (see FIG. 3D) the detent spring element 41 is not (no longer) in engagement with the pin 21 of the connector 2, so that the connector 2 is not (no longer) held at the housing 3 against the closing direction X and can be removed from the connector receptacle 30 and hence from the housing 3 against the closing direction X.

A cycle is obtained in use of the closure device 1, which can be summarized as follows.

Before closing, the closure device 1 initially is in a position in which the connector 2 and the housing 3 are separated from each other and the slide 4 is in a starting position in which the detent spring element 41 is arranged concentrically to the connector receptacle 30 of the housing, so that the pin 21 of the connector 2 can latchingly be brought in engagement with the detent spring element 41.

For closing, the connector 2 now is attached to the connector receptacle 30 in the closing direction X, so that the pin 21 with the circumferential latching portion 210 runs up onto the latching portions 410 of the detent spring element 41 and presses the same apart such that the detent spring 41 is spread transversely to the closing direction X and transversely to the opening direction Y, until the pin 21 snaps into engagement with the detent spring element 41.

When attaching the connector 2 to the housing 3, i.e., when bringing the pin 21 in engagement with the detent spring element 41, the slide is stationary to the housing 3 and does not move along the opening direction Y. Merely the detent spring element 41 is spread apart, so as to establish the latching connection of the connector 2 with the housing 3.

In the closed position, shown in FIG. 3B, the connector 2 in this way is positively held at the housing 3.

Figure 3C:
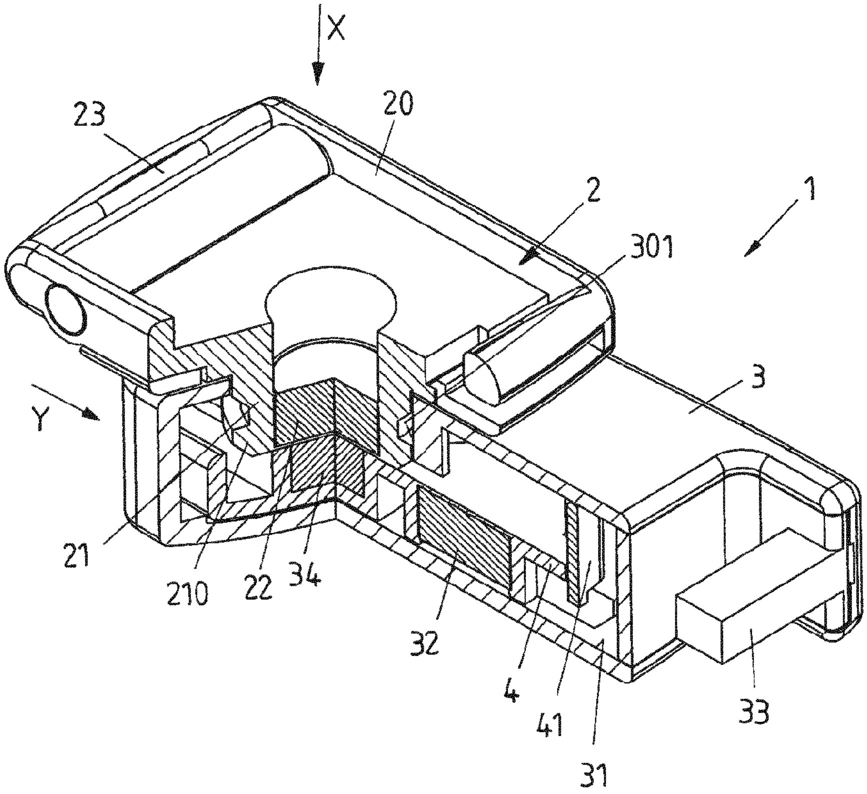
FIG. 3C shows a view of the closure device on opening with actuated slide.
Figure 3D:
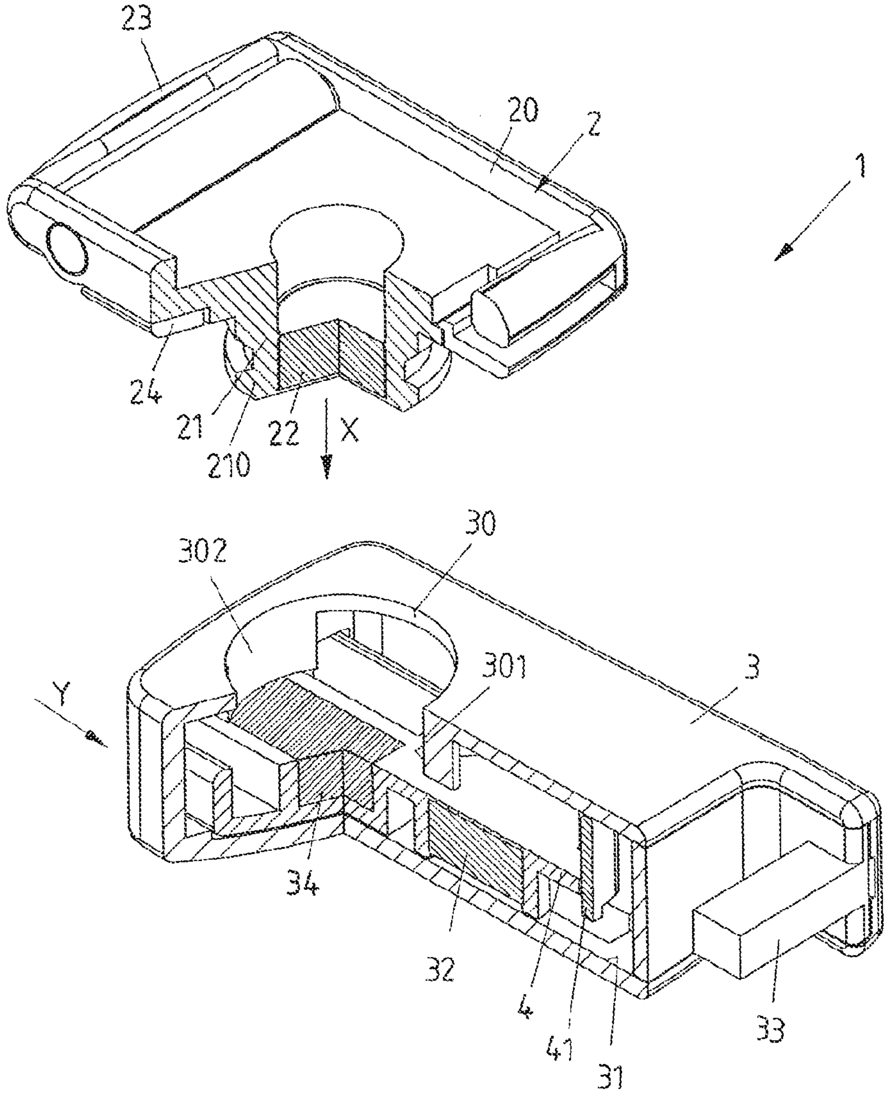
FIG. 3D shows a view of the closure device in an open position with separated connector and housing.

For opening, the slide 4 is pushed into the housing 3 in the opening direction Y, so that the detent spring element 41 gets out of engagement with the pin 21, in that the pin 21 is moved through the circumferential opening 411 at the detent spring element 41. With inserted slide 4, as shown in FIG. 3C, the connector 2 can be removed from the housing 3 against the closing direction X, so that in the open position, shown in FIG. 3D, the connector 2 and the housing 3 are separated from each other.

This results in an asymmetry between the closing operation and the opening operation of the closure device 1 due to the fact that for closing the slide 4 is not moved, but instead the detent spring element 41 is spread by the pin 21 with its latching portion 210 running up onto the latching portions 410 of the detent spring element 41. On opening, however, the slide 4 is moved in the opening direction Y, so as to shift the latching portion 210 tangentially out of engagement with the latching portions 410 at the detent spring element 41, wherein definitely no or only a slight spreading of the detent spring element 41 occurs, but in any case no running up of the latching portion 210 onto the latching portions 410 along the closing direction X.

The closure device 1 can be designed as a purely mechanical closure device 1. In this case, the connector 2 must be pressed into the connector receptacle 30 in the closing direction X for closing the closure device 1, in order to lockingly bring the pin 21 in engagement with the detent spring element 41. Opening then likewise is effected purely mechanically by shifting the slide 4 in the opening direction Y, wherein in addition a resetting mechanical spring element 35 is provided, which biases the slide 4 in direction of the starting position shown in FIG. 3A and hence effects that after an opening of the closure device 1, the slide 4 gets back into the starting position and the connector 2 thus can again be brought in engagement with the detent spring element 41.

In an advantageous embodiment, the connector 2, the housing 3 and/or the slide 4 include magnetic means 22, 32, 34, which can be designed for supporting the closing and opening movement. In principle, the magnetic means 22, 32, 34 can be formed as magnets or on the one hand as magnets and on the other hand as magnetic armatures fabricated of a ferromagnetic material, wherein each magnetic means 22, 32, 34 can consist of one or more elements.

In an advantageous embodiment, a magnet 22 is arranged at the connector 2, which in the closed position of the closure device 1 is opposed to a magnet or a magnetic armature 32 in the region of the detent spring element 41 at the slide 4, wherein the magnet 22 at the connector 2 and the magnet or the magnetic armature 32 at the slide 4 effect a force of magnetic attraction which magnetically supports the closing movement of the connector 2 in the closing direction X for mechanically bringing the pin 21 in engagement with the detent spring element 41. The magnetic forces of the magnet 22 on the one hand and of the magnet or the magnetic armature 32 on the other hand can be dimensioned such that the closing operation on approach of the connector 2 to the connector receptacle 30 is effected largely automatically, in that in particular the pin 21 with its latching portion 210 largely automatically is pulled in engagement with the latching portions 410 of the detent spring element 41 by spreading the detent spring element 41.

In the embodiment shown in FIGS. 1, 2 and 3A to 3D, a further magnet 34 is arranged at the slide 4, which however need not necessarily be provided and in so far is to be regarded as optional. Providing the further magnet 34, however, has the advantage that the ejection of the connector 2 for opening the closure device 1 also can be supported magnetically, in that when shifting the slide 4 in the opening direction Y the magnet 34 is approached to the magnet 22 at the pin 21, wherein the magnets 34 and 22 point towards each other with like poles and thus have a magnetically repulsive effect. In the open position of the slide 4, the magnet 34 is located in the region of the connector receptacle 30 and thus below (as seen in closing direction X) the magnet 22 of the pin 21, so that a force of magnetic repulsion acts on the connector 2 against the closing direction X, which attempts to eject the connector 2 from the connector receptacle 30. The opening operation hence can be effected easily and in a haptically pleasant way. A deliberate removal of the connector 2 from the connector receptacle 30 is not required.

In the illustrated exemplary embodiment, however, an ejection effect also occurs without using the magnet 34, which in so far only is optional. When the magnets 22 and 32 are shifted relative to each other along the opening direction Y and the pole surfaces of the magnets 22, 32 facing each other are held plane-parallel to each other, the following course of force is obtained:

In opposed position (closed position), the vertical component of the force of attraction (directed along the closing direction X) is at a maximum, the magnets 22, 32 are centered one above the other. No magnetic forces are acting laterally in the plane vertical to the closing direction X.

When the magnet 32 is shifted laterally in the opening direction Y relative to the magnet 22, the vertical component of the force of magnetic attraction decreases, namely approximately up to the point at which the magnets 22, 32 only have a small overlap or just no more overlap. At the same time, an increasing moment acts with increasing displacement, which attempts to rotate the magnets 22, 32 with their pole surfaces towards each other. However, this is prevented by guide elements 301, 302 (which will be explained in detail below).

Upon exceedance of this point (approximately after shifting the magnets 22, 32 relative to each other along the opening direction Y by a distance corresponding to the diameter of the magnets 22, 32), when the magnets 22, 32 are held plane-parallel to each other, an ejection force acts on the magnet 22 and hence on the connector 2 against the closing direction X. This force initially increases in a very narrow shifting range during the further displacement in the opening direction Y and thereafter slowly decreases again with increasing displacement.

When no third magnet 34 is used, the shifting path of the slide 4, which leads to the latching being released and thus to the closure device 1 being opened, advantageously just can be dimensioned for a measure in the region of this maximum, so that an advantageous ejection effect is obtained and can be utilized for ejecting the connector 2.

At the connector receptacle 30 two guide elements 301, 302 are provided, which in the manner of webs extend from an upper surface 300 of the housing 3 axially in direction of the closing direction X and are arranged at the perimeter of the connector receptacle 30. The one guide element 301 is arranged at a front side of the connector receptacle 30—as seen in opening direction Y—and the other guide element 302 is arranged at a rear side of the connector receptacle 30.

The guide elements 301, 302 on the one hand serve to guide the connector 2 with its pin 21 during attachment to the connector receptacle 30 in the closing direction X into engagement with the detent spring element 41.

On the other hand, the guide elements 301, 302 serve to support the pin 21 and thus the connector 2 with respect to the housing 3 when shifting the slide 4 for opening the closure device 1, so that the connector 2 cannot tilt relative to the housing 3 and the pin 21 is held at the housing 3 in a position coaxial to the closing direction X.

The front guide element 301 here is of particular importance, which supports the pin 21 in particular when shifting the slide 4 in the opening direction Y. This is due to the fact that the connector 2 and the pin 21 in principle are not moved when the slide 4 is shifted in the opening direction Y. Due to friction between the latching portions 210, 410 and due to magnetic forces acting between the magnetic means 22, 32, 34, however, an action of force on the connector 2 occurs, which possibly might lead to tilting of the connector 2 in the connector receptacle 30 and thereby possibly might impair a removal of the connector 2. This is prevented by providing the front guide element 301, in that on shifting the slide 4 in the opening direction Y the pin 21 is pressed into contact with the front guide element 301 and a full contact with the axially extending, front guide element 301 thereby is effected, which prevents tilting of the connector 2 in the connector receptacle 30.

The prevention of tilting can have a positive influence on the function in two respects: Firstly, jamming of the connector 2 in the housing 3 on opening can be prevented. Secondly, an ejection effectively can be achieved when using only two magnets 22, 32, which is the stronger the more exactly the connector 2 is guided in the housing 3.

In the illustrated exemplary embodiment, the spring element 35 in principle also can be omitted as resetting means for transferring the slide 4 into the starting position after actuation for opening purposes. The magnetic means 22, 32, 34 also have a resetting effect such that when the pin 21 approaches the connector receptacle 30 of the housing 3, the slide 4 is pulled against the opening direction Y in direction of the starting position as shown in FIG. 3A (the magnetic means 22, 32 at the pin or at the slide 4 attract each other, the magnetic means 22, 34 repel each other).

In principle, other resetting means also can be employed, for example a pneumatic spring element, or resetting can be effected due to the gravity acting on the slide 4 in a position of normal use (e.g. at a bag).

The closure device 1 in particular can be used for connecting two belts. At the connector 2 on the one hand and at the housing 3 on the other hand, a fastening device 23, 33 in the form of a belt anchorage each can be arranged for example, which clampingly holds a belt at the connector 2 or the housing 3.

When a belt webbing clamping device is used, a clamping lever 24 for example can be provided (such as for example in the exemplary embodiment at the connector 2), which must be released for clampingly holding a belt webbing. Via pivot pins 240, which in the mounted condition of the clamping lever 24 engage into cutouts 230 at the body 20 of the connector 2, the clamping lever 24 is pivotally mounted at the body 20 about a pivot axis S and is located on a side of the body 20 which in the closed position faces the housing 3, so that in the closed position of the closure device 1 the clamping lever 24 is arranged between the connector 2 and the housing 3 and cannot be actuated by the connector 2 for releasing the belt webbing.

In the exemplary embodiment of the closure device 1 as shown in FIGS. 1, 2 and 3A to 3D, the connector 2 is formed with a fixed pin 21 arranged at the body 20. It is also conceivable and possible to arrange the pin 21 at the body 20 so as to be adjustable along the closing direction X—as described in the German Patent Application 10 2010 044 144.9—, so that for example in a starting position the pin 21 is retracted in the body 20 and is extended from the body 20 only when approaching the housing 3 for example by action of the magnetic means 22, 32, so that it can be brought in engagement with the detent spring element 41 at the slide 4.

In the illustrated exemplary embodiment, the closure device 1 includes a connector 2 with a single pin 21 and a housing 3 with a single connector receptacle 30. It can be conceivable and advantageous to arrange several pins 21 at a connector 2 and correspondingly several connector receptacles 30 at a housing 3. For opening such closure device 1 a slide then can be provided, which is formed integrally and for releasing the connections of each pin 21 with an associated detent spring element 21 can be shifted at the associated connector receptacle 30. Instead of a single slide, a plurality of slides can however also be provided, which either can be operated individually or are coupled with each other for joint actuation.

Figure 4A:
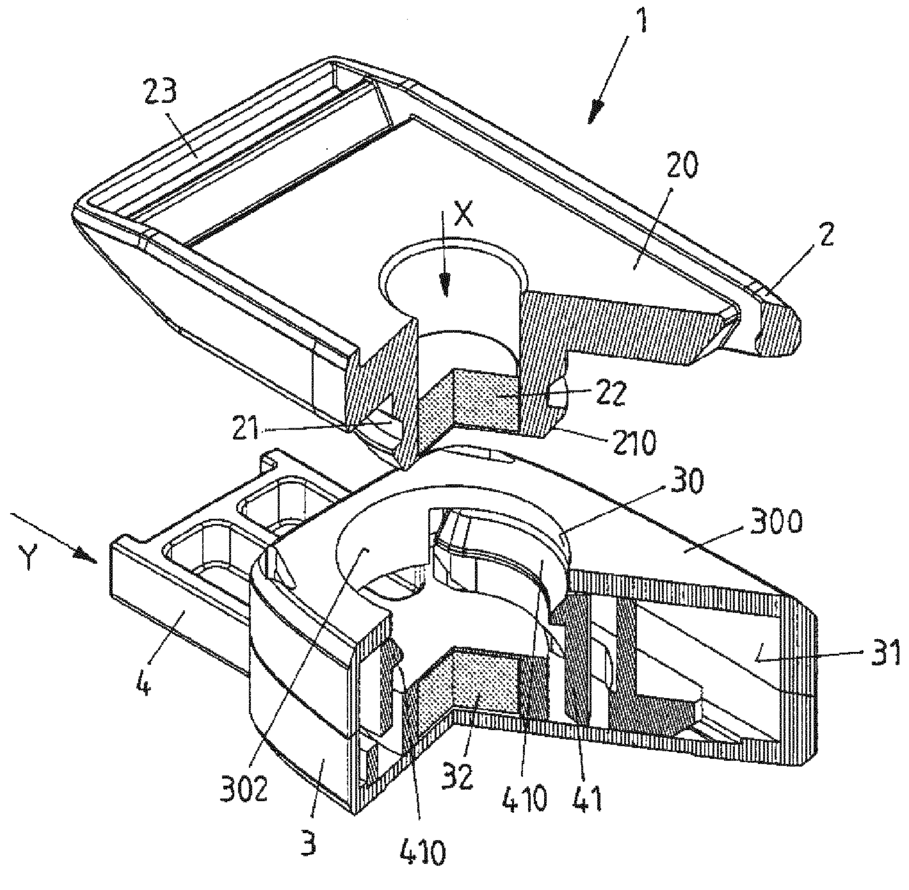
FIG. 4A shows a view of a further exemplary embodiment of a closure device before closing.
Figure 4B:
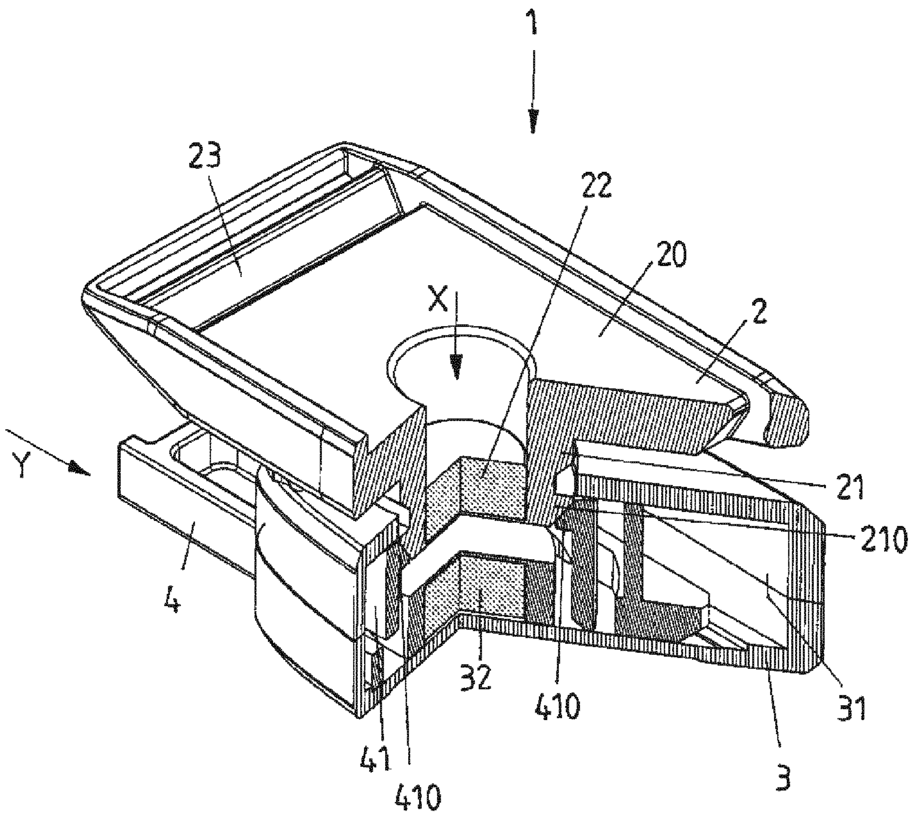
FIG. 4B shows a view of the closure device on closing.
Figure 4C:
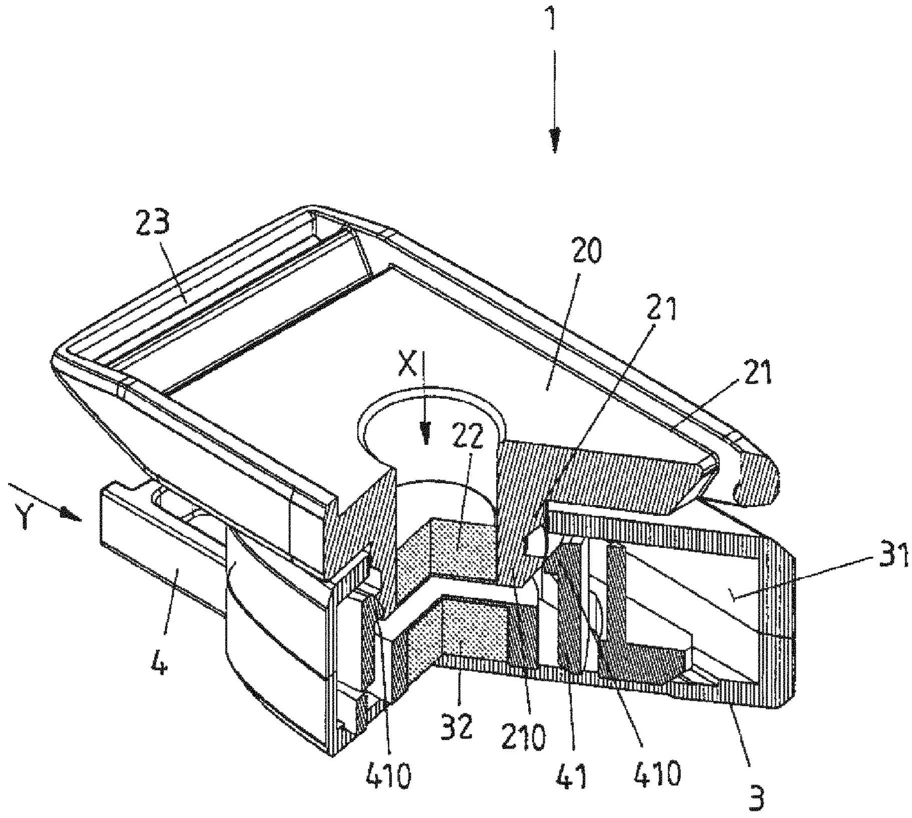
FIG. 4C shows a view of the closure device on closing.
Figure 4D:
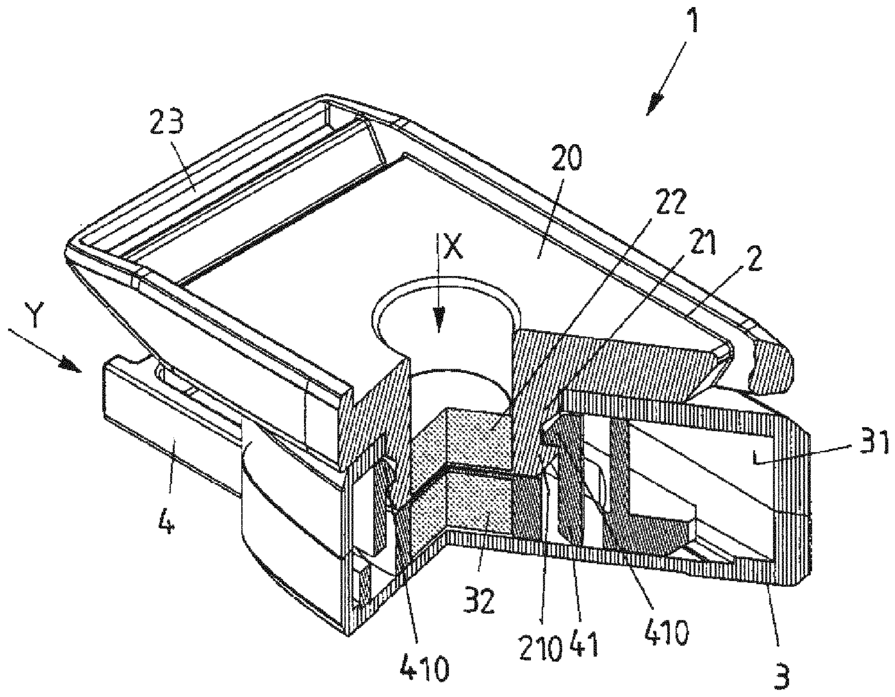
FIG. 4D shows a view of the closure device in a closed position.
Figure 4E:
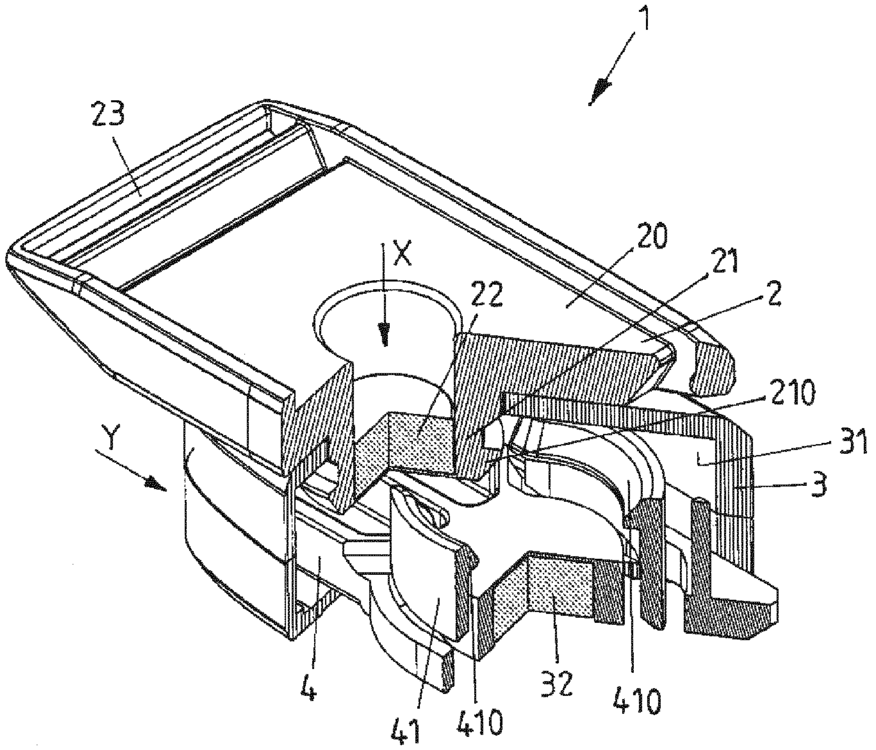
FIG. 4E shows a view of the closure device on opening with actuated slide.
Figure 4F:
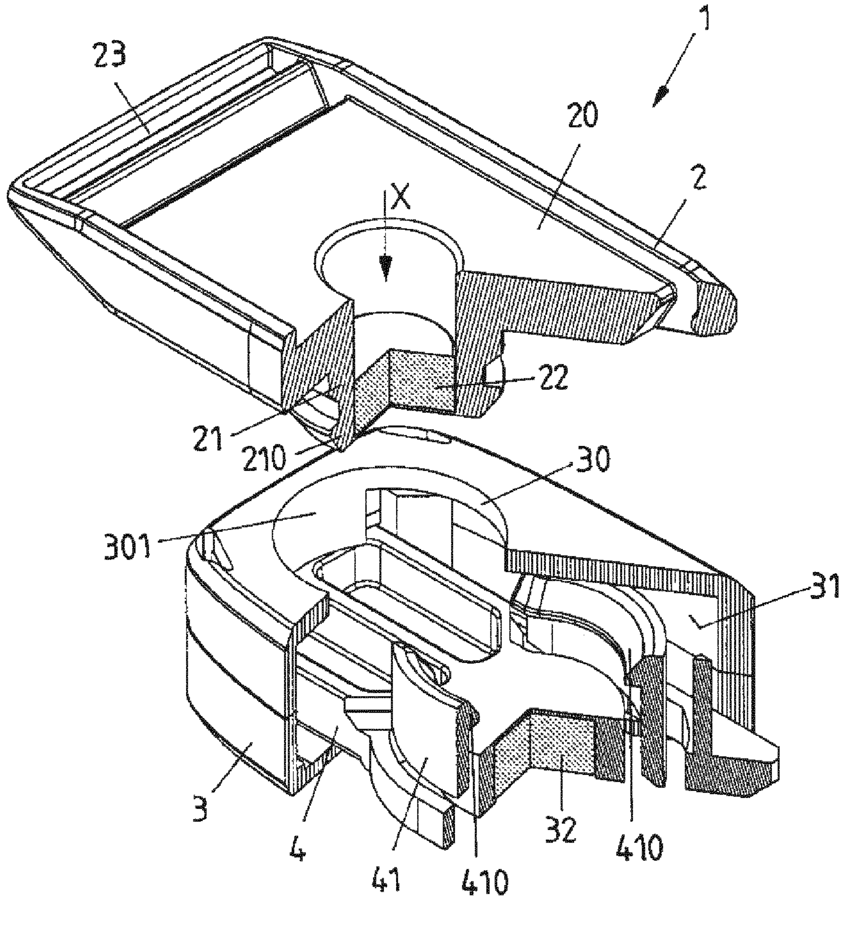
FIG. 4F shows a view of the closure device in an open position with separated connector and housing.

A further exemplary embodiment of a closure device 1 is shown in FIGS. 4A to 4F in different positions of a connector 2, a housing 3 and a slide 4 in a position before closing (FIG. 4A), during closing (FIGS. 4B and 4C), in a closed position (FIG. 4D), during opening (FIG. 4E), and in an open position with separated connector 2 and housing 3 (FIG. 4F). This exemplary embodiment substantially is functionally identical with the exemplary embodiment described above with reference to FIGS. 1 to 3, so that reference will be made to the above explanations. As far as expedient, components of identical function are provided with the same reference numerals.

Figure 5A:
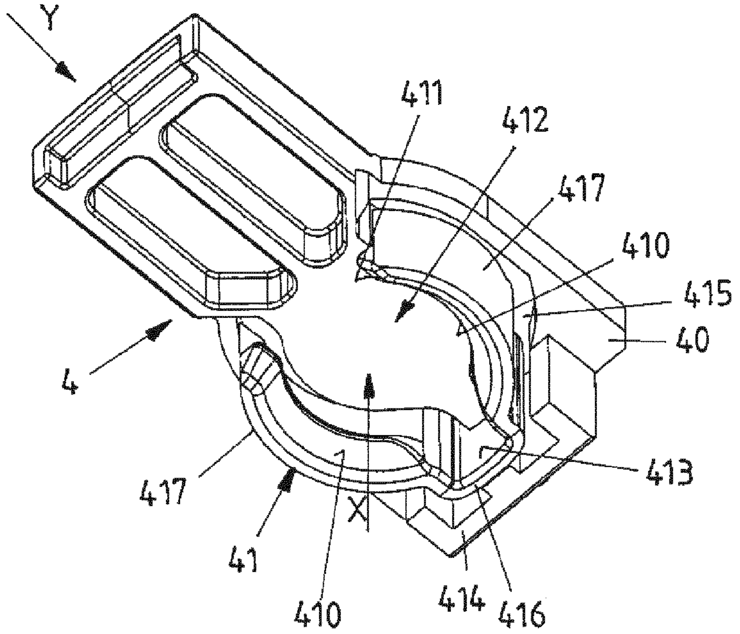
FIG. 5A shows a perspective view of the slide of the exemplary embodiment according to FIGS. 4A to 4F.
Figure 5B:
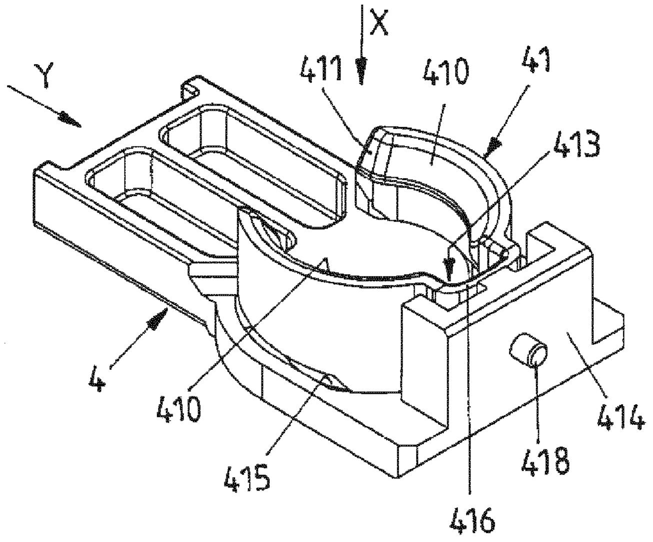
FIG. 5B shows another perspective view of the slide.

FIGS. 5A and 5B show separate views of the slide 4 of the exemplary embodiment according to FIGS. 4A to 4F.

In contrast to the exemplary embodiment according to FIGS. 1 to 3, a detent spring element 41 is integrally molded to the slide 4 in the exemplary embodiment according to FIGS. 4A to 4F, which slide for example can be manufactured as molded plastic part by means of plastics injection molding.

As shown in the separate views according to FIGS. 5A and 5B, the detent spring element 41 is molded to a body 40 of the slide 4 and is held at the body 40 via a holding portion 414. The detent spring element 41 includes two lateral spring portions 417, which converge in a connecting portion 416 and are cut clear of the body 40 via relief cuts 415. Via the connecting portion 416, the detent spring element 41 is integrally molded to the holding portion 414 and held by the same at the body 40.

The detent spring element 41 includes a cutout 413 into which the guide element 301 engages on closing and in the closed position (see FIGS. 4A to 4D in a synopsis with e.g. FIG. 3A, in which the guide element 301 is shown).

The spring portions 417 of the detent spring element 41 follow a circular contour and form the detent spring element 41 substantially ring-shaped in design, which is circumferentially open by an opening 411, as is also described above for the exemplary embodiment according to FIGS. 1 to 3. Between the spring portions 417 a receiving opening 412 is formed, in which the connector 2 with its pin 21 is latchingly held in the closed position (see FIG. 4D).

The mode of operation of the closure device 1 on closing (FIGS. 4A to 4D) and on opening (FIGS. 4E and 4F) in principle is analogous to the above-described exemplary embodiment according to FIGS. 1 to 3. In particular, in the closure device 1 there is also obtained a cycle function in which for closing the connector 2 is inserted into the connector receptacle 30 of the housing 3 in closing direction X and latchingly brought in engagement with the detent spring element 41 of the slide 4, and for opening the slide 4 is shifted in the opening direction Y, the connector 2 is removed against the closing direction X and subsequently the slide 4 is set back against the opening direction Y, so that the closure device 1 can be closed again.

Because on closing the pin 21 of the connector 2 with its latching portion 210 runs up onto the latching portions 410 at the spring portions 417 of the detent spring element 414 (see FIGS. 4B and 4C), the spring portions 417 on the one hand are pushed aside transversely to the opening direction Y and the detent spring element 41 thereby is widened, wherein at the same time the slide 4 slightly moves in the opening direction Y, because the latching portion 210 of the pin 21 runs up onto the latching portions 410 in the region of the ends of the spring portions 417 adjoining the connecting portion 416. Because the detent spring element 41 is not resilient or at least resilient only little in the region of the connection of the spring portions 417 with the connecting portion 416, the detent spring element 41 cannot back away elastically in the opening direction Y, so that the slide 4 as a whole slightly moves in the opening direction Y, until the latching portion 210 snaps into engagement with the latching portions 410 and the closure device 1 gets into the closed position according to FIG. 4D.

The movement of the slide 4 in the opening direction Y, however, is small and maximally comprises the width of the radial protrusion of the latching portion 410 (i.e. the path along which the detent spring element 41 must back away, so that the latching portions 410 can get in engagement with the latching portion 210).

The opening operation substantially is analogous to what has been described above for the exemplary embodiment according to FIGS. 1 to 3. It should be noted that opening of the closure device 1 is not effected, when the slide 4 is moved in the opening direction Y merely by the path along which the slide 4 backs away on closing. For opening, the slide 4 must be shifted by a distance which is sufficient to bring the pin 21 out of engagement with the detent spring element 41 along the opening direction Y, as is shown in FIG. 4E.

In contrast to the exemplary embodiment according to FIGS. 1 to 3, the connector 2 in the exemplary embodiment according to FIGS. 4A to 4F and 5A, 5B has no clamping lever for mounting the belt, but merely a fastening mechanism 23 in the form of a belt clip for wrapping with a belt. The design of the belt anchorage in principle is arbitrary and also can be of a completely different type.

A pin 418 (see FIG. 5B) is provided at the slide 4, in order to define an end position of the slide 4 in the sliding guideway 31 of the housing 3 on opening.

The invention is not limited to the exemplary embodiments described above, but rather can also be realized in principle in completely different embodiments.

In particular, the shifting path of the slide 4 need not necessarily be designed straight, but in principle can also have another, curved shape. Correspondingly, the opening direction Y can be curved.

The shifting path for example can lie on a circular path around the closing direction X and thus in a plane vertical to the closing direction X.

It is, however, also conceivable to arrange the shifting path on a circular path around a direction transverse to the closing direction X and transverse to the opening direction Y, so that the shifting path lies in the plane defined by the opening direction Y and the closing direction X.

The slide can of course also be designed to be actuated by applying a tensile force (and not by applying a compressive force, like in the exemplary embodiments described above). The basic mode of operation of the closure device is not changed thereby.

LIST OF REFERENCE NUMERALS

1 closure device
2 connector
20 body
21 pin
210 latching portion
22 magnetic means
23 fastening mechanism
230 cutout
24 clamping lever
240 pivot pin
3 housing
30 connector receptacle

300 upper surface
301 first guide element
302 second guide element
31 sliding guideway
32 magnetic means
33 fastening mechanism
34 magnetic means
35 spring element
4 slide
40 body
41 detent spring element
410 latching portion
411 opening
412 receiving opening
413 cutout
414 holding portion
415 relief cut
416 connecting portion
417 spring portion
418 contact pin
42 holding element
S pivot axis
X closing direction
Y opening direction

The invention claimed is:

1. A closure device for connecting two parts, comprising:

a connector, a housing which comprises a connector receptacle, into which the connector is insertable in a closing direction for closing the closure device, a slide shiftably arranged at the housing, which for opening the closure device is shiftable along an opening direction different from the closing direction, a detent spring element which in a closed position of the closure device latchingly holds the connector at the housing and for opening the closure device can be moved out of engagement with the connector by shifting the slide in the opening direction, in order to release the connector from the housing, so that in an open position of the closure device the connector is separated from the housing, and at least one guide element which guides the connector on insertion into the connector receptacle for closing the closure device along the closing direction into the closed position and supports the connector against tilting relative to the closing direction when the slide is shifted for opening the closure device, wherein the connector and the slide each comprise at least one magnet, and wherein in the closed position the at least one magnet of the connector and the at least one magnet of the slide oppose each other in a magnetically attracting manner and on opening are shifted with respect to each other along the opening direction such that a force of magnetic repulsion is exerted on the connector relative to the housing against the closing direction, wherein the detent spring element is formed by a ring which is arranged on the slide and comprises a circumferential opening circumferentially interrupting a perimeter of the ring, and wherein the connector comprises a pin insertable into the connector receptacle, the detent spring element circumferentially enclosing and elastically receiving the pin within an inner bore in the closed position of the closure device such that the detent spring element is in positive locking engagement with the pin, wherein, by shifting the slide in the opening direction, the detent spring element is moved with respect to the pin such that the pin passes through said opening of the detent spring element for releasing the positive locking engagement between the detent spring element and the pin.

2. The closure device according to claim 1, wherein the at least one guide element is arranged at the connector receptacle.

3. The closure device according to claim 1, wherein the connector receptacle is formed by a recess at the housing.

4. The closure device according to claim 1, wherein the at least one guide element is formed by a surface portion at the connector receptacle of the housing, which extends along the closing direction and in the closed position fully is in contact with the connector.

5. The closure device according to claim 1, wherein the at least one guide element is arranged at the housing such that the guide element supports the connector relative to the housing when a load acts on the connector in the opening direction.

6. The closure device according to claim 1, wherein at the pin a first latching portion is arranged, which in the closed position latchingly is in engagement with a second latching portion at the housing or the slide.

7. The closure device according to claim 6, wherein in the closed position the pin rests against the at least one guide element.

8. The closure device according to claim 6, wherein the first latching portion is arranged at the pin circumferentially around the closing direction.

9. The closure device according to claim 1, wherein the detent spring element is spring-elastic in a direction transverse to the closing direction such that on closing of the closure device the detent spring element can be spread in the direction transverse to the closing direction.

10. The closure device according to claim 9, wherein by shifting the slide in the opening direction, the detent spring element is brought out of engagement with the pin of the connector.

11. The closure device according to claim 9, wherein when shifting the slide in the opening direction, the detent spring element is shifted together with the slide.

12. The closure device according to claim 1, wherein the detent spring element is formed integrally with the slide.

13. The closure device according to claim 1, wherein in the closed position the connector is rotationally movably held at the housing around the closing direction.

14. The closure device according to claim 1, wherein in the direction of a position in which the connector is mechanically connectable with the housing for closing the closure device, the slide is mechanically, pneumatically or magnetically biased with respect to the housing.

* * * * *